(No Model.) 2 Sheets—Sheet 1.
H. E. STAPLES, L. T. COVELL & H. E. HEAGLE.
ROOT CUTTING MACHINE.
No. 430,704. Patented June 24, 1890.
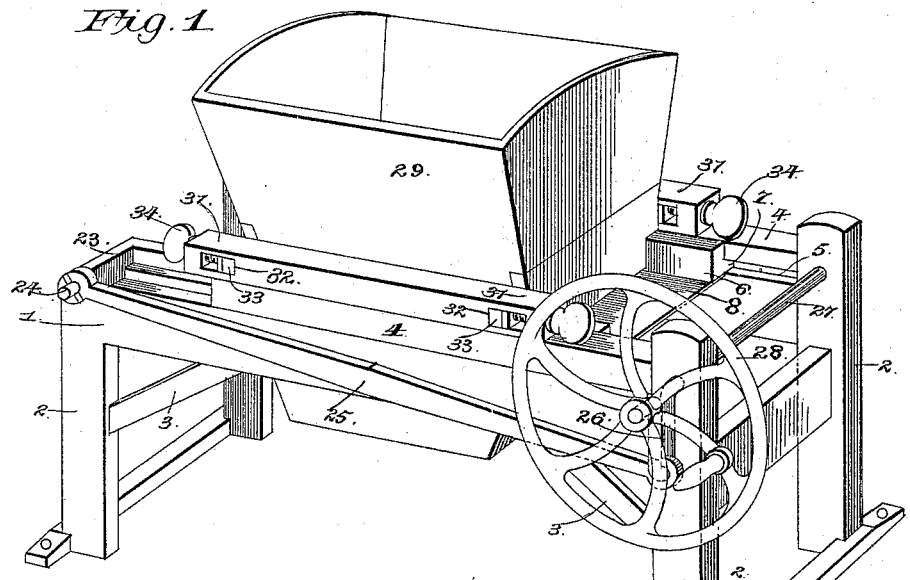
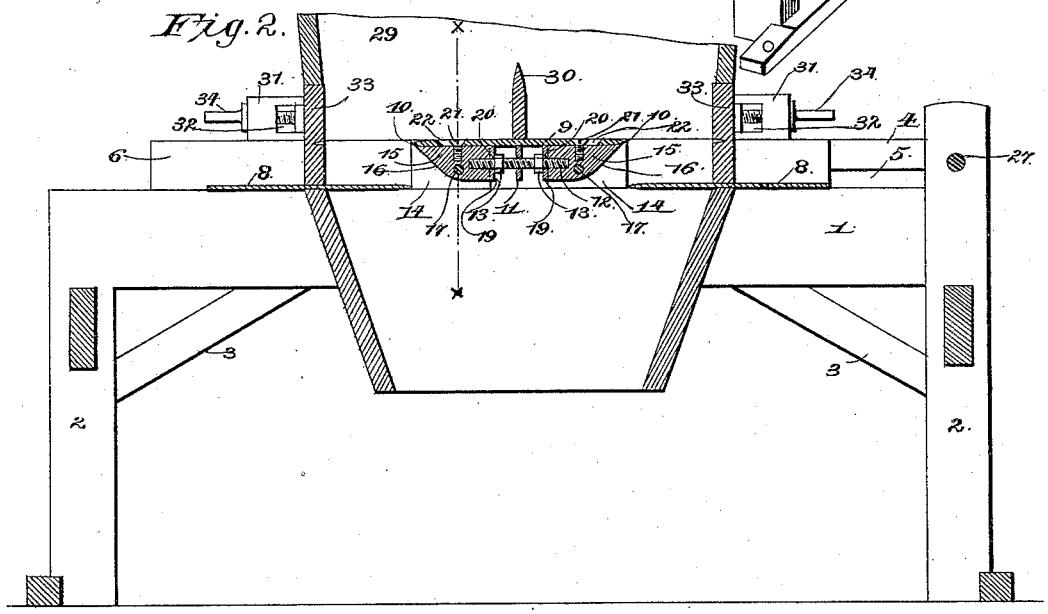
Witnesses
M. Fowler
Wm. Bagger
Inventors
Hiram E. Staples,
Lyman T. Covell and
Henry E. Heagle
By their Attorneys
C. A. Snow & Co.
THE NORRIS PETERS CO., PHOTO-LITHO., WASHINGTON, D. C.

(No Model.) 2 Sheets—Sheet 2.

H. E. STAPLES, L. T. COVELL & H. E. HEAGLE.
ROOT CUTTING MACHINE.

No. 430,704. Patented June 24, 1890.

Witnesses
M. Fowler
Wm. Bagger

Inventors
Hiram E. Staples,
Lyman T. Covell and
Henry E. Heagle
By their Attorneys
C. A. Snow & Co.

UNITED STATES PATENT OFFICE.

HIRAM E. STAPLES, LYMAN T. COVELL, AND HENRY EDWIN HEAGLE, OF WHITEHALL, MICHIGAN.

ROOT-CUTTING MACHINE.

SPECIFICATION forming part of Letters Patent No. 430,704, dated June 24, 1890.

Application filed November 5, 1889. Serial No. 329,287. (No model.)

*To all whom it may concern:*

Be it known that we, HIRAM E. STAPLES, LYMAN T. COVELL, and HENRY EDWIN HEAGLE, citizens of the United States, residing at Whitehall, in the county of Muskegon and State of Michigan, have invented new and useful Root-Cutting Machines, of which the following is a specification.

This invention relates to machines for cutting roots for the purpose of feeding to stock or cattle; and it has for its object to construct a machine of this class which shall be simple, durable, and efficient, and by means of which the roots by a single operation may be cut into long narrow strips which may be fed to cattle without danger of choking.

The invention consists in the improved construction, arrangement, and combination of parts, which will be hereinafter fully described, and particularly pointed out in the claims.

Figure 3:
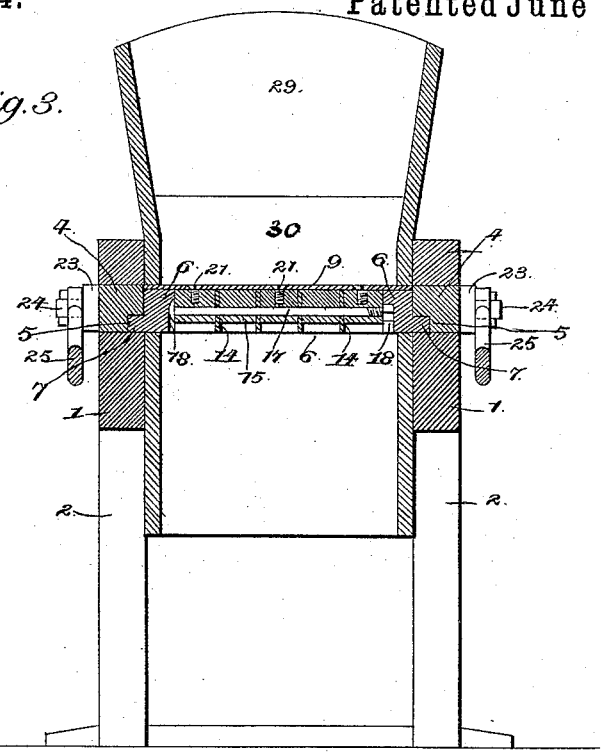
Figure 4:
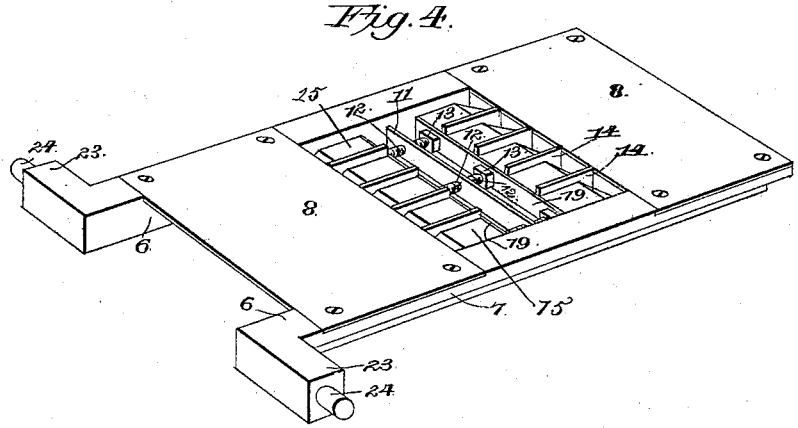

In the drawings hereto annexed, Figure 1 is a perspective view of our improved root-cutting machine. Fig. 2 is a longitudinal sectional view of the same. Fig. 3 is a vertical transverse sectional view taken on the line x x in Fig. 2. Fig. 4 is a perspective detail view showing the cutter-frame in an inverted position.

Like numerals of reference indicate like parts in all the figures.

1 designates a horizontal supporting-frame, which is mounted upon legs 2 2, with which it may be connected by means of inclined braces 3 3. Upon the upper side of the side pieces of the frame are secured the guide-cleats 4 4, the inner sides of which have ways or bearings 5 for the longitudinally-reciprocating cutter-frame 6, the sides of which latter are provided with laterally-extending cleats 7 to work in said ways.

The cutter-frame is composed of the side pieces 6 6, the under sides of which are connected at their front and rear ends by the bottom plates 8 8, which are constructed preferably of sheet metal. The upper sides of the side pieces 6 6 are connected intermediately between the bottom plates 8 8 by the knife or cutting plate 9, the front and rear edges of which 10 10 are sharpened for the purpose of cutting the roots, as will be hereinafter described. The sides of the cutter-frame are connected centrally below the cutter 9 by means of a transverse brace 11, in which are mounted a series of longitudinal bolts 12, projecting in front and in rear of the transverse brace 11, and provided at both ends with adjusting-nuts 13.

14 14 designate two series of vertical cutters, arranged in front and in rear of the transverse partition-brace 11. The cutters 14 of each series are spaced by blocks 15, the outer ends of which are beveled, as shown at 16, and they are secured by means of transverse bolts 17, extending through the said blocks and cutters, and the heads and nuts at the ends of which are accommodated in recesses 18 in the inner sides of the cutter-frame.

At the inner ends of the cutters 14 and spacing-blocks 15 are mounted the bearing-plates 19, having openings 20, through which the ends of the bolt 12 extend into the inner ends of the spacing-block 15. It will be seen that by operating the adjusting-nuts 13 the cutters and spacing-blocks 14 and 15 may be forced in an outward direction toward the edges 10 of the knife or cutter 9. The said spacing-blocks and cutters are securely attached to the said cutter 9 by means of bolts or screws 21 having flat heads which work in countersunk longitudinal slots 22 in the said cutter 9.

One end of the cutter-frame is provided with outwardly-extending arms 23, having spindles 24, which are connected by pitman 25 with cranks 26 formed upon a shaft 27, which is mounted in suitable bearings at one end of the frame. The shaft 27 is provided with a crank wheel or drum 28, by means of which it may be operated, thereby communicating a longitudinally-reciprocating motion to the cutter-frame.

29 designates a hopper, which is mounted upon the supporting-frame 1 or upon the guide-cleats 4, secured upon the upper side of the latter. The said hopper is provided with a central partition 30, and at its sides are arms 31, having longitudinal slots 32, in which the ends of the transverse abutting or cutting blocks 33 are longitudinally adjustable. The ends of the arms 31 have set-screws 34 mounted therein and adapted to bear against the ends of the blocks 33, which may thereby be forced in an inward direction. Said "cutting-blocks," as we term them, are extended downwardly to the upper sides or surfaces of the plates 8 of the reciprocating cutter-frame, as will be clearly seen in Fig. 2 of the drawings, and the inner sides of said cutting-blocks serve to receive the impact of the knife-edges when in operation a reciprocating motion is imparted to the cutter-frame. It is therefore necessary that these cutting-blocks, as well as the knives or cutters, should be adjustable to agree with the throw of the cranks or the movement of the cutter. It will be seen from the foregoing that not only the vertical cutters 14, but also the bearing-blocks 33 are capable of longitudinal adjustment, thus enabling wear upon either the knives or the bearing-blocks to be compensated for. The cutting-blocks 33 may also be conveniently removed and replaced by new ones when necessary.

The operation of our invention and its advantages will be readily understood from the foregoing description, taken in connection with the drawings hereto annexed. The roots which are to be cut are placed in the compartments of the hopper and a reciprocating movement is imparted to the cutter-frame, thereby causing the contents of the compartments of the hopper to drop alternately upon the plates 8, forming the bottom of the two ends of the cutter-frame. When the latter is moved in either direction, the contents of the compartments of the hopper will be engaged by the sharp edges of the horizontal and vertical knives or cutters, and thus be cut into long narrow strips of suitable dimensions, which are deflected downwardly by the beveled ends of the spacing-blocks between the vertical cutters and caused to drop through a tube or spout secured to the under side of the frame.

It will be understood that the knives or cutters may be readily detached for the purpose of sharpening the same; also, that all the parts of the machine are very conveniently accessible for the purpose of repairing the same or replacing parts thereof in case of necessity.

The machine herein shown and described is, as will be seen, double-acting and adapted to cut the roots by the movement of the cutter-frame in either direction; but we reserve the right to make a machine embodying the principles of construction herein described, but adapted to cut only in one direction.

Having thus described our invention, what we claim, and desire to secure by Letters Patent, is—

1. In a root-cutter, the longitudinally-reciprocating cutter-frame having the horizontal knife secured upon its upper side and provided with bottom plates secured to the under sides of its side pieces, in combination with the transverse brace-bar, the bolts or screw-threaded rods mounted longitudinally in the latter and having the adjusting-nuts, the longitudinally-adjustable vertical knives and spacing-blocks mounted upon the under side of the horizontal knife and the bearing-plates, substantially as set forth.

2. The combination, with the horizontal knife having longitudinal countersunk slots, of the vertical knives and bevel-ended spacing-blocks, the transverse connecting-bolts, the screws or bolts for securing said vertical knives and spacing-blocks to the under side of the horizontal knife, and mechanism for adjusting said knives and spacing-blocks longitudinally, substantially as set forth.

3. In a root-cutter, the longitudinally-reciprocating cutter-frame comprising the side pieces and the bottom plates, in combination with the horizontal knife secured upon the upper side of the cutter-frame, the transverse brace having longitudinal bolts and adjusting-nuts, the vertical knives and spacing-blocks, the transverse bolts connecting the latter and extending into recesses in the sides of the cutter-frame, screws or bolts for attaching said vertical knives and spacing-blocks to the under side of the horizontal knife, and the bearing-plate, all arranged and operating substantially as and for the purpose set forth.

4. In a root-cutter, the combination of the longitudinally-reciprocating cutter and the vertical longitudinally-adjustable knives and spacing-blocks with the hopper having the adjustable cutting-blocks to receive the impact of the knives or cutters, the discharge-spout, and suitable operating mechanism, substantially as set forth.

5. The combination of the supporting-frame, the guide-cleats mounted upon the latter and having longitudinal ways or bearings in their sides, the longitudinally-reciprocating cutter-frame mounted in said ways or bearings and having the horizontal and vertical knives and cutters, and the hopper having the longitudinally-adjustable cutting-blocks, substantially as and for the purpose set forth.

6. In a root-cutting machine, the combination of the supporting-frame, the hopper having longitudinally-adjustable cutting-blocks, the discharge-spout, the longitudinally-reciprocating cutter-frame having the stationary horizontal knife and the longitudinally-adjustable vertical knives and spacing-blocks, and the bottom plates secured to the under side of the cutter-frame, all arranged and operating substantially as and for the purpose set forth.

In testimony that we claim the foregoing as our own, we have hereto affixed our signatures in presence of two witnesses.

HIRAM E. STAPLES.
  LYMAN T. COVELL.
  HENRY EDWIN HEAGLE.

Witnesses:
 GEO. A. HOBLER,
 H. EARL STAPLES.